US010759690B2

(12) United States Patent
Boeker et al.

(10) Patent No.: US 10,759,690 B2
(45) Date of Patent: Sep. 1, 2020

(54) METHOD FOR CUTTING A THIN GLASS LAYER

(71) Applicant: SAINT-GOBAIN GLASS FRANCE, Courbevoie (FR)

(72) Inventors: Juergen Boeker, Cologne (DE); Li-Ya Yeh, Geilenkirchen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 96 days.

(21) Appl. No.: 15/741,226

(22) PCT Filed: Aug. 10, 2016

(86) PCT No.: PCT/EP2016/069008
§ 371 (c)(1),
(2) Date: Dec. 29, 2017

(87) PCT Pub. No.: WO2017/025550
PCT Pub. Date: Feb. 16, 2017

(65) Prior Publication Data
US 2018/0186678 A1 Jul. 5, 2018

(30) Foreign Application Priority Data
Aug. 10, 2015 (EP) ..................................... 15180376

(51) Int. Cl.
C03B 33/09 (2006.01)
C03B 33/02 (2006.01)
(Continued)

(52) U.S. Cl.
CPC ........ C03B 33/093 (2013.01); B23K 26/0006 (2013.01); B23K 26/53 (2015.10); C03B 33/0222 (2013.01); B23K 2103/54 (2018.08)

(58) Field of Classification Search
CPC .................................................. C03B 33/093
See application file for complete search history.

(56) References Cited

U.S. PATENT DOCUMENTS 5,609,284 A 3/1997 Kondratenko
5,622,540 A 4/1997 Stevens
(Continued)

FOREIGN PATENT DOCUMENTS

DE 20 2007 001 346 U1 4/2007
DE 10 2008 026 339 A1 12/2009
(Continued)

OTHER PUBLICATIONS

Advisory Action for U.S. Appl. No. 15/122,898, filed Aug. 31, 2016 on behalf Saint-Gobain Glass France. dated Jul. 15, 2019. 3 Pages.
(Continued)

Primary Examiner — Lisa L Herring
(74) Attorney, Agent, or Firm — Pillsbury Winthrop Shaw Pittman LLP

(57) ABSTRACT

Method for cutting a glass layer having a first surface a second surface. The method includes moving a first laser beam, which is generated by a pulsed laser, along a cutting line, where material modifications are produced in the interior of the glass layer between the first surface and the second surface; moving a second laser beam along the cutting line where the glass layer is heated by the laser radiation; and cooling the glass layer along the cutting line, where the glass layer breaks along the cutting line.

9 Claims, 3 Drawing Sheets

Figure 1:
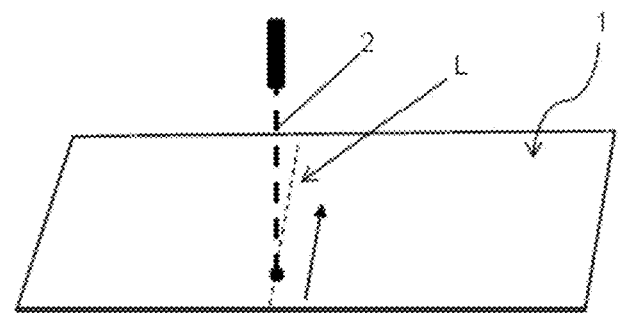
Figure 1:
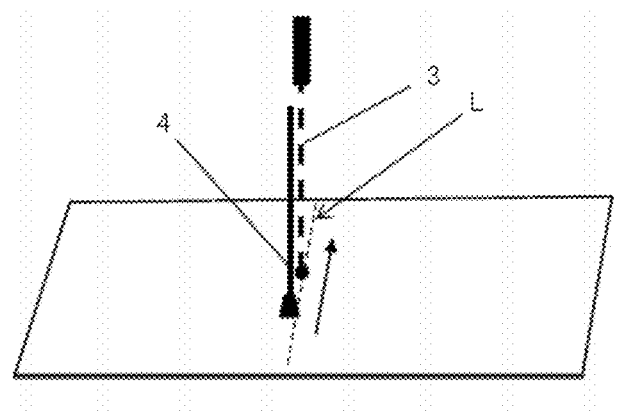

(51) Int. Cl.
  *B23K 26/53*  (2014.01)
  *B23K 26/00*  (2014.01)
  *B23K 103/00*  (2006.01)

(56) References Cited

U.S. PATENT DOCUMENTS

| | | | |
|---|---|---|---|
| 6,056,861 | A | 5/2000 | Fuhr et al. |
| 6,407,360 | B1 | 6/2002 | Choo et al. |
| 6,744,009 | B1 | 6/2004 | Xuan et al. |
| 2004/0227462 | A1 | 11/2004 | Utsumi et al. |
| 2008/0144162 | A1 | 6/2008 | Duroux et al. |
| 2008/0236199 | A1 | 10/2008 | Sklyarevich et al. |
| 2009/0294419 | A1* | 12/2009 | Abramov ............ B23K 26/0736 219/121.68 |
| 2011/0049765 | A1 | 3/2011 | Li et al. |
| 2012/0024928 | A1 | 2/2012 | Matsumoto et al. |
| 2012/0026573 | A1 | 2/2012 | Collins et al. |
| 2012/0112225 | A1 | 5/2012 | Le Bellac et al. |
| 2012/0125967 | A1 | 5/2012 | Furuta et al. |
| 2012/0182592 | A1 | 7/2012 | Ferreira et al. |
| 2013/0126573 | A1 | 5/2013 | Hosseini et al. |
| 2013/0221053 | A1 | 8/2013 | Zhang |
| 2014/0132132 | A1 | 5/2014 | Chowdhury et al. |
| 2014/0216108 | A1 | 8/2014 | Wiegel et al. |
| 2014/0340730 | A1* | 11/2014 | Bergh ............... C03B 33/0222 359/275 |
| 2015/0034613 | A1 | 2/2015 | Hosseini |
| 2015/0165548 | A1 | 6/2015 | Marjanovic et al. |
| 2015/0165560 | A1 | 6/2015 | Hackert et al. |
| 2016/0016257 | A1* | 1/2016 | Hosseini ............ B23K 26/0648 65/112 |
| 2016/0023448 | A1 | 1/2016 | Bookbinder et al. |
| 2016/0031745 | A1 | 2/2016 | Ortner et al. |
| 2016/0158880 | A1 | 6/2016 | Koitzsch et al. |
| 2017/0050877 | A1 | 2/2017 | Altman et al. |
| 2017/0066679 | A1 | 3/2017 | Yeh |
| 2018/0057390 | A1* | 3/2018 | Hackert ............. C03B 33/0215 |

FOREIGN PATENT DOCUMENTS

| | | | |
|---|---|---|---|
| EP | 0 876 608 | B1 | 4/2002 |
| EP | 1 862 849 | A1 | 12/2007 |
| EP | 2 463 249 | A1 | 6/2012 |
| EP | 2641881 | A1 | 9/2013 |
| JP | 2001-212683 | A | 8/2001 |
| JP | 2004-182530 | A | 7/2004 |
| JP | 2007152958 | A | 6/2007 |
| JP | 2015-171953 | A | 10/2015 |
| KR | 10-2006-0102261 | | 9/2006 |
| KR | 20140138456 | A | 12/2014 |
| RU | 202441 | C1 | 12/1994 |
| WO | 2007/119740 | A1 | 10/2007 |
| WO | 2010/112789 | A2 | 10/2010 |
| WO | 2010/147494 | A1 | 12/2010 |
| WO | 2011/033313 | A1 | 3/2011 |
| WO | 2012/007334 | A1 | 1/2012 |
| WO | 2012/066889 | A1 | 5/2012 |
| WO | 2012/067042 | A1 | 5/2012 |
| WO | 2012/166343 | A2 | 12/2012 |
| WO | 2013/050166 | A1 | 4/2013 |
| WO | 2014/010686 | A1 | 1/2014 |
| WO | 2014/030521 | A1 | 2/2014 |
| WO | 2014/075995 | A2 | 5/2014 |
| WO | 2015/010706 | A1 | 1/2015 |
| WO | WO-2015010862 | A2 * | 1/2015 |
| WO | 2015/095088 | A1 | 6/2015 |
| WO | 2015/108991 | A | 7/2015 |
| WO | 2014/030521 | A1 | 7/2016 |

OTHER PUBLICATIONS

Final Office Action for U.S. Appl. No. 15/122,898, filed Aug. 31, 2016 on behalf of Saint-Gobain Glass France. dated Apr. 2, 2019. 15 pages.
Indian Office Action for Action for Indian Application No. 201837000015 Filed on Jan. 1, 2018 on behalf of Saint Gobain Glass France. dated May 30, 2019. 5 Pages.
Japanese Office Action for Japanese Application No. 2018-506844 filed on Feb. 9, 2018 on behalf of Saint Gobain Glass France. dated Feb. 15, 2019. 8 pages (English Translation + Japanese Original).
International Search Report for International Application No. PCT/EP2016/069008 filed Aug. 10, 2016 on behalf of Saint-Gobain Glass France. dated Oct. 21, 2016. 7 pages. (German + English Translation).
Rezaei, S. "Burst-train generation for femtosecond laser filamentation-driven micromachining", Master's Thesis, University of Toronto, Jan. 2011. Pages 118.
Ahmed, F. et al. "Display glass cutting by femtosecond laser induced single shot periodic void array", Applied Physics A, Oct. 2008, No. 93, pp. 189-192.
Piao, F. et al. "Ultraviolet-induced densification of fused silica", J. of App. Phys., vol. 87, No. 7, Apr. 2000, pp. 3287-3293. 8 pages.
Watanabe, W. "Femtosecond Filamentary Modifications in Bulk Polymer Materials", Laser Physics, Feb. 2009, vol. 19, No. 2, pp. 342-345.
Written Opinion for International Application No. PCT/EP2016/069008 filed Aug. 10, 2016 on behalf of Saint-Gobain Glass France. dated Oct. 21, 2016. 11 pages. (German + English Translation).
Non-Final Office Action for U.S. Appl. No. 15/122,898, filed Aug. 31, 2016, on behalf of Saint-Gobain Glass France. dated Sep. 12, 2018. 15 pgs.
International Search Report for PCT Application No. PCT/EP2015/050540 filed on Jan. 14, 2015 on behalf of Saint-Gobain Glass France. dated Apr. 15, 2015.7 pages.
Written Opinion for PCT Application No. PCT/EP2015/050540 filed on Jan. 14, 2015 on behalf of Saint-Gobain Glass France. dated Apr. 15, 2015. 17 pages.
Restriction Requirement for U.S. Appl. No. 15/122,898, filed Aug. 31, 2016 on behalf of Saint-Gobain Glass France. dated May 25, 2018. 8 pages.
Non-Final Office Action for U.S. Appl. No. 15/122,898, filed Aug. 31, 2016 on behalf Saint-Gobain Glass France. dated Sep. 18, 2019. 10 Pages.

* cited by examiner

1) Process step (a)

2) Process steps (b) and (c)

1) Process step (a)

2) Process steps (b) and (c)

METHOD FOR CUTTING A THIN GLASS LAYER

CROSS REFERENCE TO RELATED APPLICATIONS

The present application is the U.S. national stage of International Patent Application PCT/EP2016/069008 filed on Aug. 10, 2016 which, in turn, claims priority to European Patent Application 15180376.4 filed on Aug. 10, 2015.

The invention relates to a method for cutting a thin glass layer, a device suitable therefor, and the use of a glass layer cut by the method.

The term "thin glass layers" typically means glass layers with a thickness up to approx. 1.5 mm; "ultrathin glass layers", those with a thickness up to approx. 0.3 mm. Ultrathin glass layers can, however, also have thicknesses less than 0.1 mm. Ultrathin glass layers are, in particular, used in electronic equipment, for example, as a display cover. In addition to a low weight, they are distinguished, in particular, by their high, film-like flexibility. Ultrathin glass layers are, as a result, used in particular in flexible components, for example, in flexible thin-film solar cells, OLED elements or for film-like active glazing elements with electrically switchable properties. Other applications are, for example, medical devices, and sensors.

Thin and ultrathin glass layers can, however, also be used in the field of window glazings, in particular as components of composite panes. When such composite panes are used in the automotive sector, vehicle weight can be reduced, which can, for example, result in a saving of fuel or battery capacity.

There is a need for processing methods for thin and ultrathin glass layers, which differ in their technical processing properties from thicker glass panes such that conventional mechanical glass cutting methods are often unsuitable. This is especially true for ultrathin glass layers, in the case of which cutting to size can result in a rough cut edge with microcracks and other damage, and subsequent edge processing, as is customary with thicker glass panes, is impossible due to the low thickness. Laser cutting methods yield a better result and they have been used on thin and ultrathin glass layers as, for example, in WO 2012/067042 A1 and WO 2013/050166 A1.

US 2013/0126573 A1 discloses a method for cutting glass layers. By irradiation of a glass layer with a pulsed laser focused on the interior of the glass layer with a pulse duration less than 100 ps, a predetermined breaking point in the form of the desired cutting line is produced. The laser radiation results in internal modifications of the microstructure of the glass layer (so-called "filaments") that are arranged along the cutting line and weaken the structure, thus forming the predetermined breaking point. The actual breaking of the glass layer is subsequently done by mechanical pressure.

The breaking of glass by mechanical pressure can be integrated into an industrial mass production process only with difficulty since, as a rule, it must be done manually. Additionally, there are limits to the maximum curvature of the cutting line since the tools for exerting the pressure cannot be designed as intricately as desired. When various smaller panes are to be cut from a large pane, small radii of curvature and small distances between cutting lines of adjacent cutting patterns are, however, necessary to avoid excessive material waste. In the case of ultrathin glass, these difficulties occur to a particularly high degree due to the fragility associated with the low glass thickness. Thus, a glass separation process effective without direct mechanical contact with the glass is desirable.

WO 2014/075995 A2 discloses another method for cutting glass layers, wherein the predetermined breaking point is produced in the form of so-called "filaments". In order to avoid the undesirable damage to the glass layer associated with filamentation, it is proposed to carry out the method in a low-OH-ion protective atmosphere.

US 2015/0034613 A1 discloses another method for cutting glass layers. The predetermined breaking point is also produced here by filamentation by a laser focused outside the glass layer. The actual breaking of the glass layer can be done by irradiation with another laser. This method is, however, particularly unusable on ultrathin glass since the strong heating with the second laser results in deformations in the ultrathin glass layer.

The object of the present invention is to provide an improved method for cutting a thin or ultrathin glass layer and a device suitable therefor. The method should result in the smoothest possible cut edges, have a low risk of glass damage, and enable cutting lines with strong curvature.

The object of the present invention is accomplished according to the invention by a method for cutting a glass layer according to the disclosure. Preferred embodiments emerge from the disclosure.

The glass layer has a first surface and a second surface as well as a circumferential side edge. The method according to the invention for cutting the glass layer comprises at least the following process steps:
a) Moving a first laser beam, which is generated by a pulsed laser, along a cutting line, wherein material modifications are produced in the interior of the glass layer between the first surface and the second surface;
b) Moving a second laser beam along the cutting line, wherein the glass layer is heated by the laser radiation; and
c) Cooling the glass layer along the cutting line, wherein the glass layer breaks along the cutting line.

The advantage of the method according to the invention consists in that the cutting is carried out without mechanical processing steps (such as breaking by mechanical pressure). Thus, the glass layer is cut apart in a gentle manner such that smooth cut edges form without bothersome damage. The method is also well suited for automated processing. The cooling of the glass layer produces adequate tensions in the glass and simultaneously prevents excessive heating by the second laser beam such that, even with ultrathin glass layers, undesirable glass deformations can be effectively prevented. Since no mechanical pressure with suitable tools has to be exerted for breaking the glass, very small radii of curvature of the glass layers cut can be realised. It has been demonstrated that radii of curvature of less than 2 mm can be produced unproblematically, which is not reliably possible with mechanical breaking. It is also possible to realise cutting lines with only a small distance between them. When subregions are to be cut from a large-area glass layer, this is possible with only a very small loss of material (waste).

The glass edge cut according to the invention has an edge strength in the range from approx. 100 MPa to 200 MPa, for example, approx. 120 MPa (according to the standardised four-point bending test known to the person skilled in the art) and is thus comparable in its stability to an edge mechanically ground according to the prior art, as is customary with thicker glass panes.

Subsequent processing steps, such as edge grinding, are, consequently, unnecessary, as a result of which the process costs and the risk of glass breakage are reduced.

In an advantageous embodiment, the contour of the cut glass layer has radii of curvature less than 2 mm. In another advantageous embodiment, the distance between different cutting lines is less than 5 mm. Such values cannot be achieved with mechanical breaking methods.

The glass layer to be cut advantageously has a thickness less than or equal to 1.5 mm (thin glass). Glass layers with such thickness can be cut unproblematically using the method according to the invention. In a preferred embodiment, the glass layer has a thickness less than or equal to 0.3 mm (ultrathin glass), for example, from 0.03 mm to 0.3 mm, or from 0.05 mm to 0.15 mm, particularly preferably less than or equal to 0.1 mm. With such low thicknesses, the advantages of the method assume special significance. Methods with mechanical processing steps, in particular mechanical breaking of the glass, result, with ultrathin glass, in unclean break edges. Methods with laser cutting without subsequent cooling result in deformations, especially with ultrathin glass layers.

The glass layer can be thermally or chemically prestressed, partially prestressed or not prestressed. In a preferred embodiment, the glass layer is not prestressed. In particular with such glass layers, the production of tensions by heating and cooling is necessary to result in the break.

In the method according to the invention, first, internal material modifications are produced in the glass layer with a pulsed laser. These material modifications are known as so-called "filaments". Individual filaments are lined up along the cutting line and preferably spaced apart from one another. As for the mechanism of the filament production, the inventors assume that due to the nonlinear Kerr effect, a self-focusing of the laser beam occurs, by means of which a higher power density is reached. Due to this high power density, the filament develops as a result of multiphoton ionization, field ionization, and electron impact ionization. The electron plasma thus generated results, in turn, in defocussing as a counterbalance to the self-focusing. The interplay of focusing and defocussing during passage of the laser radiation through the glass layer for generating a filament results in the fact that each filament structure has a series of alternating focusing and defocussing points that extends along the beam direction of the laser beam, preferably perpendicular to the surfaces of the glass layer. For a more detailed discussion of the assumed mechanism, reference is made to US 2013/0126573 A1, in particular paragraphs [0043] to [0048], also to W. Watanabe: "Femtosecond Filamentary Modifications in Bulk Polymer Materials" (Laser Physics, February 2009, Vol. 19, No. 2, pp. 342-345), F. Piao, W. G. Oldham, E. E. Haller: "Ultraviolet-induced densification of fused silica" (J. of App. Phys., Vol. 87, No. 7, 2000), F. Ahmed et al.: "Display glass cutting by femtosecond laser induced single shot periodic void array" (Applied Physics A, 2008, No. 93, pp. 189-192), and S. Rezaei: "Burst-train generation for femtosecond laser filamentation-driven micromachining", Masters Thesis, University of Toronto, 2011.

The material modifications produced by the first laser beam include, in particular, local regions of increased density, which are created by the self-focusing of the laser radiation described.

The first laser beam is moved along a desired cutting line. The laser produces a material weakening along the cutting line, which forms a predetermined breaking point for the further processing. Preferably, in this process, the first surface and the second surface of the glass layer are not damaged, i.e., not provided with a scratch, a notch, or the like. The first laser beam preferably does not result in removal of material on the first and second surface. Instead, the laser beam produces a stringing together of microstructural material modifications in the interior of the glass layer along the cutting line, so-called "filaments". Each of these filaments is produced by a series of laser pulses. Through appropriate control of the laser radiation, such series of laser pulses are emitted onto the glass layer during the movement of the laser beam along the cutting line at suitable, usually periodic, intervals. Such a series of laser pulses is frequently referred to as a "pulse train" or "pulse burst". Each pulse train produces a filament in the glass layer. Thus, a stringing together of filaments is formed along the cutting line, wherein adjacent filaments have space between them. Methods for generating such spaced pulse trains are known to the person skilled in the art, for example, by means of a so-called "burst generator". By moving the pulsed laser radiation, a track of such mutually spaced filaments is generated along the cutting line, creating the predetermined breaking line. The glass layer is perforated, as it were, by the filaments. The material modification can be considered as a local increase in density, which is associated with a different refractive index.

In a preferred embodiment, the focus of the first laser beam is positioned between the first surface and the second surface of the glass layer, before it is moved along the cutting line. Thus, particularly good internal filaments can be produced without damaging the surfaces.

In an advantageous embodiment, the first laser beam is produced by a pulsed laser with a pulse length less than 10 ps, preferably less than 10 ps, particularly preferably less than 1 ps, most particularly preferably less than 500 fs. Such short pulses are particularly advantageous in terms of the self-focusing of the radiation.

Since penetration of the glass layer by laser radiation is essential for producing the internal material modifications, a wavelength of the laser radiation at which the glass layer is substantially transparent is preferably selected. The glass layer preferably has, at the laser wavelength used, transmittance of at least 80%, particularly preferably at least 90%. For customary glass layers, a laser in the visible range, in the near UV range, or in the IR range can be used, for example, in the range from 300 nm to 2500 nm, preferably from 300 nm to 1100 nm, particularly preferably from 300 nm to 800 nm. In a particularly advantageous embodiment, the first laser beam has a wavelength from 300 nm to 500 nm, preferably from 320 nm to 400 nm, for example, 355 nm. This is, for one thing, advantageous in terms of the transparency of customary glass layers and, for another, in terms of the commercial availability of suitable and economical laser systems. The first laser beam is preferably generated by a solid-state laser with Q-switching.

The repetition rate (pulse frequency) of the first laser beam is preferably from 10 kHz to 1 MHz, particularly preferably from 20 kHz to 500 kHz, for example, 25 kHz or 100 kHz. Good results are thus achieved. However, in principle, even significantly higher pulse frequencies can be used, for example, up to 100 MHz.

The power of the laser for generating the first laser beam is preferably from 5 W to 200 W, particularly preferably from 20 W to 100 W. The pulse energy is preferably from 4 µJ to 500 µJ.

Through the selection of pulse frequency and power, it is possible to influence the material depth to which the filaments extend. Preferably, the filaments should extend over at least 40%, particularly preferably at least 50%, most particularly preferably at least 60% of the thickness of the glass layer, starting from the surface the glass layer via which the laser radiation penetrates into the glass layer. Then, the predetermined breaking point is advantageously pronounced and the subsequent material separation is efficient. In the case of thin and ultrathin glass layers, the filaments preferably extend along the entire thickness of the glass layer.

The preferably periodically occurring series of laser pulses (pulse trains), wherein each series produces a filament are emitted with a repetition rate of preferably less than 1 kHz, for example, in the range from 200 Hz to 800 Hz. Each pulse train consists of preferably at least 5 pulses, for example, in the range from 5 to 15 pulses.

The moving speed of the first laser beam along the cutting line is preferably from 50 mm/s to 1000 mm/s, for example, from 100 mm/s to 500 mm/s.

The distance between adjacent filaments can be defined by the selection of the moving speed of the laser radiation and the repetition rate of the pulse trains. The distance is preferably less than 1 mm, particularly preferably less than 100 µm, most particularly preferably less than 20 µm, for example, from 1 µm to 10 µm. An advantageous material weakening is thus achieved. Here, the term "distance" means the minimum distance between the filaments adjacent the outer boundaries. The dimension of the filaments perpendicular to the radiation direction is, for example, from 1 µm to 50 µm or from 2 µm to 10 µm.

The first laser beam is preferably focused on the glass surface by means of an optical element or system. The dimension of the focus perpendicular to the radiation direction can, for example, be 10 µm or even less.

It has been demonstrated that with unsuitable performance of the process, bubbles that negatively affect the cut edges can develop in the glass as a side effect. This risk can be reduced by not keeping the energy of the laser pulses of a pulse train constant but reducing it during the process. Alternatively or additionally, it is also possible not to keep the temporal interval between the pulses constant, but to lengthen it during the pulse train. The pulse energy should move in the range from 4 µJ to 500 µJ and the time interval between two consecutive pulses should be in the range of 50 times to 5000 times the pulse length.

After the predetermined breaking line has been generated by the first laser beam, the actual breaking of the glass layer is effected by a second laser beam. The second laser beam is moved along the cutting line over the first surface, resulting in a heating of the glass layer in the region of the cutting line. The glass layer is then cooled along the cutting line, by which means the glass layer breaks along the cutting line as a result of the thermal tensions produced. The combination of a second laser beam and cooling produces adequate tensions to cut even ultrathin glass layers less than 0.3 mm thick.

The temporal sequence of the process steps does not mean that the irradiation with the first laser must be completed along the entire cutting line before the irradiation with the second laser begins, or that the irradiation with the second laser must be completed along the entire cutting line before the cooling begins. Instead, while the first laser beam is still moving over the cutting line, it is possible to already begin irradiation of the regions already swept by the first laser beam with the second laser beam. It is also possible, while the second laser beam is still moving over the cutting line, to already begin the cooling of the regions of the cutting line already swept by the second laser beam. In particular, this last mentioned variant is advantageous because not too much time should pass between heating by the second laser beam and rapid cooling to produce the necessary thermal tensions. Preferably, a means (device) for cooling is arranged behind the second laser beam in the direction of movement, and the second laser beam and the means for cooling are moved at the same speed along the cutting line.

The glass layer is heated along the cutting line by the laser radiation. Consequently, laser radiation with a wavelength for which the glass layer has a high coefficient of absorption is particularly suitable. For this reason, laser radiation in the central infrared range is particularly suitable. The laser radiation has, for example, a wavelength of 800 nm to 20 µm, preferably of 1 µm to 20 µm, particularly preferably of 5 µm to 15 µm. Particularly suitable is a $CO_2$ laser, typically with a wavelength of 9.4 µm or 10.6 µm. Good results are also obtained, for example, with a Nd:YAG-laser. A diode laser or solid-state laser can, however, also be used, for example.

The laser for generating the second laser beam is preferably operated in the continuous wave mode (CW). It has been shown that good heating of the glass layer is thus achieved. In addition, continuous wave operation is technically simpler to implement than pulsed operation.

In a preferred embodiment, the second laser beam is focused on one of the surfaces of the glass layer. The focusing facilitates carrying out the method. However, a particularly strong or accurate focusing is not required to obtain the necessary heating.

The second laser beam is preferably focused on the glass surface by means of an optical element or system, wherein, preferably, an elongated, roughly oval beam profile is produced, for example, with a cylindrical lens. The longer axis of the elongated beam profile is preferably aligned in the direction of the cutting line. The length of the beam profile on the glass surface is preferably from 1 mm to 50 mm; the width is preferably from 100 µm to 1 mm. With this, particularly good results are obtained, in particular in terms of a clean cut edge. The focal length of the optical element is, for example, from 100 mm to 250 mm. With this, good results are obtained. The elongated beam profile can also be produced by laser scanning. Other beam profiles, for example, round, can also be used.

The second laser beam is preferably moved with a speed from 1 m/min to 30 m/min, particularly preferably from 5 m/min to 20 m/min over the glass surface, most particularly preferably from 10 m/min to 15 m/min. Thus, particularly good results are obtained.

The power of the second laser beam (output) is preferably from 30 W to 1 kW, for example, from 50 W to 100 W. With such powers, adequate heating of the glass layer can be achieved. However, significantly higher powers can also be used.

The movement of the first and second laser beam and of the coolant along the cutting line can, in principle, be done by movement of the glass layer and/or by movement of the laser radiation and of the coolant. For movement of the laser beams over an (in particular, stationary) glass layer, laser devices known per se are suitable, in the simplest case, one or a plurality of tiltable mirrors. The laser radiation can also, for example, be moved by movement of an optical waveguide, for example, a glass fiber, over the glass surface. However, it can be simpler and, consequently, preferable to leave the coolant stationary and merely move the glass pane.

After heating, the glass surface is cooled. By means of the successive heating and cooling, thermal tensions are produced along the cutting line, automatically resulting, in the case of thin or ultrathin glass layers, in the desired breakage. Moreover, the cooling prevents deformations of the heated glass, in particular in the case of ultrathin glass layers. The cooling is preferably done by impacting the glass surface with a gaseous and/or liquid coolant along the cutting line. The invention is not limited to specific coolants. Preferred coolants are cooled gas and/or water, since such cooling is simple to realise and economical. Suitable gases are, for example, carbon dioxide or nitrogen.

The coolant is preferably brought, by means of a nozzle, along the cutting line onto the glass surface. The nozzle is preferably moved over the glass surface at the same speed behind the second laser beam. The time difference between the heating of the glass layer by means of laser radiation and the cooling ("quenching") of the glass layer is preferably from 10 ms to 500 ms, particularly preferably from 50 ms to 100 ms. Particularly suitable thermal tensions are produced, resulting in an effective break with clean breaking edges.

An advantage of the method according to the invention is that it can be integrated in a simple manner into industrial mass production, in which ultrathin glass layers are typically rolled onto a roll in the starting condition. Consequently, in an advantageous embodiment, the ultrathin glass layer is rolled off a roll immediately before cutting.

The glass layer is not limited to a specific type of glass. Instead, the method according to the invention is, in principle, usable on glass layers of any composition. The glass layers include, for example, soda lime glass or borosilicate glass.

The invention further includes a device for cutting a glass layer having a first surface and a second surface, at least comprising:

- a pulsed laser for generating a first laser beam, which is suitable for and provided for being moved along a cutting line to produce material modifications in the interior of the glass layer between the first surface and the second surface,
- a laser for generating a second laser beam, which is suitable for and provided for being moved along the cutting line to heat the glass layer, and
- a means for cooling the glass layer along the cutting line.

The advantageous embodiments set forth above in connection with the method according to the invention apply in the same manner for the device.

The device includes means to move the glass layer, on the one hand, and the laser beams as well as the coolant, on the other, relative to one another. This can be done via the movement of the glass layer or the movement of the laser beams as well as the coolant.

The device further includes, in an advantageous embodiment, a roll holder, into which a roll provided with an ultrathin glass layer can be inserted. The role holder is arranged such that the glass rolled from the roll can be processed with the first laser beam, the second laser beam, and the means for cooling.

The invention further includes the use of a glass layer cut according to the invention in a thin-film solar cell or active glazing with switchable, in particular electrically switchable properties, preferably an electrochromic element, PDLC element (polymer dispersed liquid crystal), an electroluminescent element, an organic light-emitting diode (OLED), or SPD element (suspended particle device). The glass layer can also be used as a component of a vehicle glazing, for example, a passenger car, truck, or a rail vehicle, such as a train or a streetcar. The glass layer can, for example, be used as a component of a laminated side window pane, in particular as an inner pane of the laminate.

Figure 2:
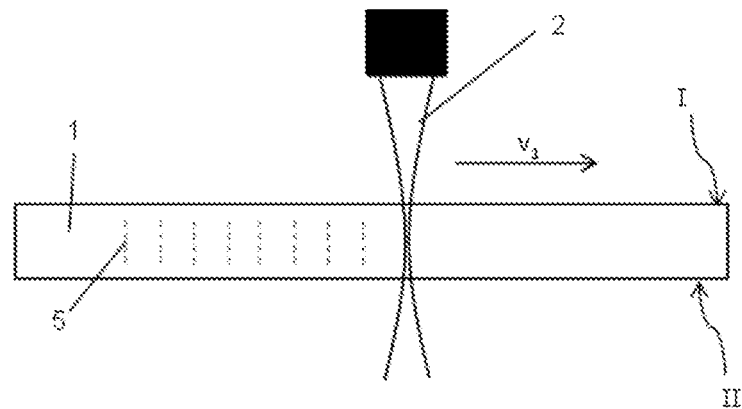
Figure 2:
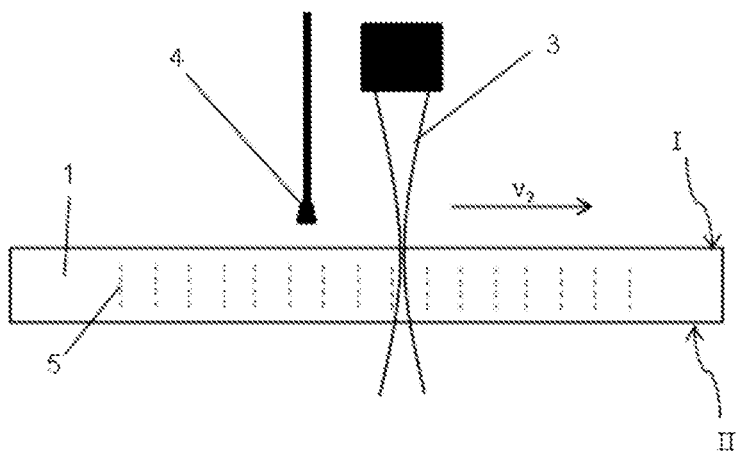
Figure 3:
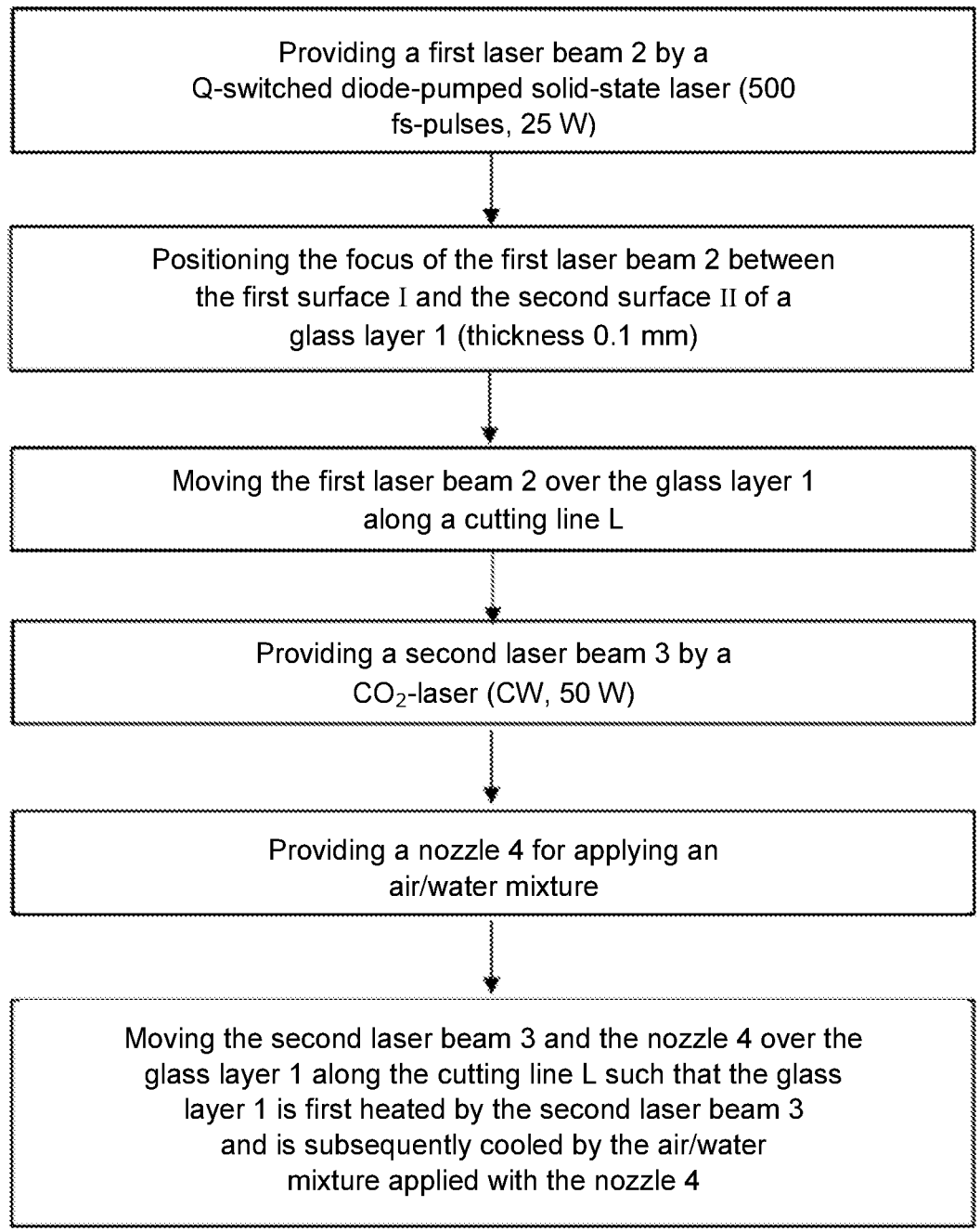

The invention is explained in detail with reference to drawings and exemplary embodiments. The drawings are schematic representations and not to scale. The drawings in no way restrict the invention. They depict:

FIG. 1 a perspective view of a glass layer during the method according to the invention, FIG. 2 a cross-section through the glass layer along the cutting line L, FIG. 3 an exemplary embodiment of the method according to the invention with reference to a flowchart.

FIG. 1 and FIG. 2 show in each case a detail of a schematic representation of the method according to the invention for cutting a glass layer 1, for example, an ultrathin glass layer with a thickness of 80 µm.

First, a first laser beam 2, which is focused on the interior of the glass layer 1 between the two glass surfaces I, II, is moved along a desired cutting line L. The first laser beam 2 is generated by a pulsed laser with a pulse length of, for example, 500 fs, a pulse frequency of, for example, 25 kHz, a power of, for example, 50 W, and a wavelength of, for example, 355 nm. A suitable laser is, for example, a Q-switched solid-state laser, in particular a diode-pumped solid-state laser. The glass layer 1 is nearly transparent at the wavelength of the first laser beam. However, the highly concentrated laser radiation results in internal modifications of the glass material, so-called "filaments" 5. These modifications 5 are limited to the interior of the glass; the glass surfaces I, II are not changed or damaged. The material modifications 5 are lined up along the cutting line L. The local weakening of the glass layer associated with the material modifications 5 defines the cutting line L as the predetermined breaking point. Each filament is produced by a pulse train of the first laser beam 2. The pulse trains separated from one another include, in each case, for example, 5 pulses and are produced with a so-called "burst generator".

Subsequently, a second laser beam 3 is moved along the cutting line L. The second laser beam 3 is, for example, the beam of a $CO_2$ laser in the continuous wave mode with a wavelength of 10.6 µm and a power of 50 W. The second laser beam 3 is focused on the glass surface by means of cylindrical optics (not shown) with an elongated beam profile. On the glass surface, the profile has, for example, a length of 30 mm and a width of 500 µm. The beam profile is aligned along the cutting line L, i.e., the long axis of the beam profile lies on the cutting line L. The second laser beam 3 is effectively absorbed by the glass layer 1, thus heating the glass layer along the cutting line L.

Behind the second laser beam 3, a nozzle 4 is moved along the cutting line L. The laser beam 3 and the nozzle 4 move at the same speed. The glass layer is impacted by means of the nozzle 4 with coolant, for example, cooled $CO_2$. The rapid cooling of the heated glass layer results in thermal tensions, resulting in breakage of the glass layer 1 along the cutting line L.

The arrows shown in the figure indicate the direction of motion. The speed $v_1$ for the movement of the first laser beam 2 is, for example, 125 mm/s. The second laser beam 3 and the nozzle 4 are moved in direct succession with the speed $v_2$ of, for example, 250 mm/s.

The cutting line L is schematically depicted as a straight line. In reality, however, very complex shapes can be realised. For example, smaller panes with virtually any shape can be cut from a large-area glass layer. As has been demonstrated, the breaking of the glass layer occurs automatically due to the thermal tensions. Active breaking by exertion of pressure can, consequently, be dispensed with. Thus, small radii of curvature can be realised and material waste can be reduced. In addition, the method yields smooth cut edges without bothersome damage such as microcracks. These are major advantages of the present invention.

FIG. 3 depicts an exemplary embodiment of the method according to the invention for cutting glass layers.

EXAMPLE 1

50-µm-thick glass layers were subjected to various cutting methods and the separation effect compared. The process conditions and the observations in the majority of cases are summarised in Table 1.

TABLE 1

| | Producing the pre-determined breaking line | Separating the glass layer | Observation |
|---|---|---|---|
| A | Filaments by Q-switched diode-pumped solid-state laser (355 nm, 500 fs, 25 kHz, 25 W) | Heating by $CO_2$-laser (CW, 50 W, 10.6 µm) | Deformation of the glass |
| B | Filaments by Q-switched diode-pumped solid-state laser (355 nm, 500 fs, 25 kHz, 25 W) | Heating by $CO_2$-laser (CW, 50 W, 10.6 µm) + Cooling with CO2 | Clean separation of the glass |

Only the Method B according to the invention resulted in reliable separation of the glass layer. Without the cooling (Method A), the thermal loading of the ultrathin glass layer is obviously so high that deformations occur.

EXAMPLE 2

Shapes having radii of curvature of 1.5 mm were cut from 50-µm-thick glass layers using various cutting methods. The processing conditions and the observations in the majority of cases are summarised in Table 2.

TABLE 2

| | Producing the pre-determined breaking line | Separating the glass layer | Observation |
|---|---|---|---|
| A | Filaments by Q-switched diode-pumped solid-state laser (355 nm, 500 fs, 25 kHz, 25 W) | mechanical pressure | Damaging of the glass layer to be cut out |
| B | Filaments by Q-switched diode-pumped solid-state laser (355 nm, 500 fs, 25 kHz, 25 W) | Heating by $CO_2$-laser (CW, 50 W, 10.6 µm) + Cooling with $CO_2$ | Clean separation of the glass layer to be cut out |

By means of the Method B according to the invention, it was possible to cut out the complex shapes unproblematically. In the case of the Comparative Method A with mechanical pressure, the complex shapes were damaged during separation.

LIST OF REFERENCE CHARACTERS (1) glass layer
(2) first laser beam (for producing the predetermined breaking line along L)
(3) second laser beam (for severing the glass layer 1)
(4) nozzle for cooling the glass layer 1
(5) filament/local internal material modification
$v_1$ moving speed of the first laser beam 2
$v_2$ moving speed of the second laser beam 3
L cutting line
I first surface of the glass layer 1
II second surface of the glass layer 1

The invention claimed is:

1. A method for cutting a glass layer with a thickness less than or equal to 0.3 mm, having a first surface and a second surface, comprising:
    a) moving a first laser beam, generated by a pulsed laser with a pulse length less than 1 ps and a repetition rate from 20 kHz to 500 kHz, having a wavelength of 300 nm to 500 nm and a power of 20 W to 100 W, along a cutting line,
        wherein a focus of the first laser beam is positioned between the first surface and the second surface, and
        wherein material modifications including local regions of increased density developing through self-focusing of a radiation of the first laser beam are produced in the interior of the glass layer between the first surface and the second surface;
    b) moving a second laser beam along the cutting line, wherein the glass layer is heated by the laser radiation; and
    c) cooling the glass layer along the cutting line, wherein the glass layer breaks along the cutting line,
        wherein each material modification is generated by a pulse train, in which a time interval between consecutive pulses becomes larger and is from 50 times up to 5000 times the pulse length.

2. The method according to claim 1, wherein along the cutting line, a distance between adjacent material modifications is less than 100 µm.

3. The method according to claim 2, wherein the distance between adjacent material modifications is less than 20 µm.

4. The method according to claim 1, wherein a pulse energy of the consecutive pulses decreases and wherein the pulse energy is from 4 µJ to 500 µJ.

5. The method according to claim 1, wherein the second laser beam has a wavelength of 1 µm to 20 µm.

6. The method according to claim 1, wherein the second laser beam is generated by a laser in a continuous wave mode.

7. The method according to claim 1, wherein the second laser beam has a power of 30 W to 1 kW.

8. The method according to claim 1, wherein the cooling of the glass layer is done by impacting with a gaseous and/or liquid coolant along the cutting line, by means of a nozzle.

9. A method comprising:
    cutting a glass layer with a thickness less than or equal to 0.3 mm by performing a method according to claim 1 to provide a cut glass layer, and
    positioning the cut glass layer in an arrangement selected from the group consisting of a thin-film solar cell, an active glazing with electrically switchable properties, an electrochromic element, a polymer dispersed liquid crystal (PDLC) element, an electroluminescent element, an organic light-emitting diode (OLED), a suspended particle device (SPD) element, and a component of a vehicle glazing.

* * * * *